United States Patent
Nakamura et al.

(10) Patent No.: US 10,152,075 B2
(45) Date of Patent: Dec. 11, 2018

(54) INFORMATION EQUIPMENT, CONTROL SYSTEM AND CONTROL METHOD

(71) Applicant: KYOCERA Corporation, Kyoto-shi, Kyoto (JP)

(72) Inventors: Kazutaka Nakamura, Yokohama (JP); Takashi Inoue, Zama (JP); Daisuke Hoshi, Sakura (JP)

(73) Assignee: KYOCERA Corporation, Kyoto (JP)

( * ) Notice: Subject to any disclaimer, the term of this patent is extended or adjusted under 35 U.S.C. 154(b) by 281 days.

(21) Appl. No.: 14/782,873

(22) PCT Filed: Apr. 8, 2014

(86) PCT No.: PCT/JP2014/060189
§ 371 (c)(1),
(2) Date: Oct. 7, 2015

(87) PCT Pub. No.: WO2014/168145
PCT Pub. Date: Oct. 16, 2014

(65) Prior Publication Data
US 2016/0070283 A1    Mar. 10, 2016

(30) Foreign Application Priority Data
Apr. 9, 2013    (JP) .................... 2013-081676

(51) Int. Cl.
*G05F 1/66* (2006.01)
*H02J 13/00* (2006.01)
*G05B 15/02* (2006.01)

(52) U.S. Cl.
CPC ............. *G05F 1/66* (2013.01); *G05B 15/02* (2013.01); *H02J 13/0013* (2013.01); *G08C 2201/41* (2013.01); *Y02B 70/3241* (2013.01); *Y02B 90/2607* (2013.01); *Y02B 90/2684* (2013.01); *Y02E 60/7884* (2013.01);
(Continued)

(58) Field of Classification Search
CPC ....... H02J 13/0013; G05B 15/02; G05B 1/66; G05F 1/66
See application file for complete search history.

(56) References Cited

U.S. PATENT DOCUMENTS

2003/0210126 A1  11/2003  Kanazawa
2012/0250864 A1  10/2012  Nishibayashi et al.
(Continued)

FOREIGN PATENT DOCUMENTS

JP    2002-044764 A    2/2002
JP    2003-309883 A    10/2003
(Continued)

OTHER PUBLICATIONS

International Search Report dated Jun. 3, 2014 issued for International Application No. PCT/JP2014/060189.
(Continued)

*Primary Examiner* — Vincent H Tran
(74) *Attorney, Agent, or Firm* — Procopio Cory Hargreaves and Savitch LLP

(57) ABSTRACT

Information equipment 300 is controlled by a HEMS 200 and located in a consumer's facility 10. The information equipment 300 comprises a storage unit 300configured to store a variable indicating a route type of an operational instruction on the information equipment 300.

8 Claims, 9 Drawing Sheets

(52) U.S. Cl.
CPC .............. *Y04S 20/227* (2013.01); *Y04S 40/12* (2013.01); *Y04S 40/143* (2013.01)

(56) References Cited

U.S. PATENT DOCUMENTS

| | | |
|---|---|---|
| 2012/0286924 A1 | 11/2012 | Goto |
| 2014/0176807 A1* | 6/2014 | Schafer ................ H04N 5/4403 348/734 |

FOREIGN PATENT DOCUMENTS

| | | |
|---|---|---|
| JP | 2004-023966 A | 1/2004 |
| JP | 2010-128810 A | 6/2010 |
| JP | 2011/064865 A1 | 6/2011 |
| JP | 2013-009033 A | 1/2013 |
| WO | 2011/064865 A1 | 6/2011 |

OTHER PUBLICATIONS

Office Action dated Sep. 5, 2017 issued in counterpart Japanese Application No. 2013-081676.
Extended European Search Report dated Dec. 12, 2016 issued by the European Patent Office in counterpart European Application No. 1472448.6.
Office Action dated Nov. 28, 2017 issued in counterpart Japanese Application No. 2013-081676.
Extended European Search Report dated Dec. 12, 2016 issued by the European Patent Office in counterpart European Application No. 14 78 2448.

* cited by examiner

FIG. 6
SET COMMAND (FIRST FORMAT)
SET COMMAND (SECOND FORMAT)
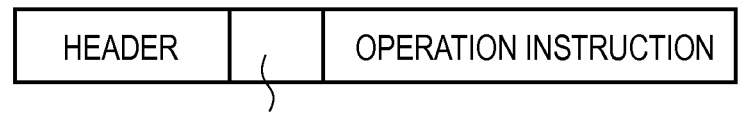
OPERATION ROUTE SPECIFYING INFORMATION
FIG. 7
SET COMMAND (FIRST FORMAT)
OPERATION ROUTE SPECIFYING INFORMATION
SET COMMAND (SECOND FORMAT)
OPERATION ROUTE SPECIFYING INFORMATION

INFORMATION EQUIPMENT, CONTROL SYSTEM AND CONTROL METHOD

TECHNICAL FIELD

The present invention relates to information equipment located in a consumer's facility, and a control system and a control method for controlling information equipment.

BACKGROUND ART

In recent years, a control system (EMS: energy management system) controlling a plurality of pieces of information equipment has been drawn attention (for example, Patent Literature 1). In such a control system, a control apparatus controlling the plurality of pieces of the information equipment is installed.

As a control apparatus, there is an HEMS (home energy management system) located in a house, a BEMS (building energy management system) located in a building, an FEMS (factory energy management system) located in a factory, an SEMS (store energy management system) located in a store, or the like.

As the plurality of pieces of the information equipment, there are a distributed power apparatus, a power storage apparatus, a thermal storage apparatus, and a load. The distributed power apparatus is an apparatus generating power by using natural energy, such as solar light, wind power, or geothermal power, like a solar cell or the like. Otherwise, the distributed power apparatus is an apparatus generating power by using fuel gas like a fuel cell such as an SOFC (solid oxide fuel cell). The power storage apparatus is an apparatus storing power like a secondary battery or the like. The thermal storage apparatus is an apparatus converting power to heat and storing the heat like a water heater or the like. The load is a refrigerator, an illuminator, an air conditioner, a TV, or the like.

CITATION LIST

Patent Literature

Patent Literature 1: Japanese application publication No. 2010-128810

SUMMARY OF INVENTION

With the spread of operation terminals such as a smartphone, there is a demand for performing remote control of the information equipment by using the operation terminal at an outside of the consumer's facility (house, building, factory, store, or the like) where the information equipment is located. However, in the treatment of such remote control, problems in safety need to be considered.

In this regard, the present invention was made to solve the above problem, and an object thereof is to provide information equipment, a control system and a control method having a function of performing remote control of information equipment while considering problems in safety.

Information equipment according to first aspect is controlled by a control apparatus and located in a consumer's facility. Information equipment comprises a storage unit configured to store a variable indicating a route type of an operational instruction on the information equipment.

In the first aspect, information equipment comprises a notifying unit configured to notify, when the variable stored in the storage unit is changed, the control apparatus of an operation route identifier indicating the changed variable.

In the first aspect, information equipment comprises a notifying unit configured to notify, according to reception of a setting command including the operational instruction on the information equipment, the control apparatus of an operation route identifier indicating the route type of the operational instruction included in the setting command.

In the first aspect, information equipment comprises a notifying unit configured to notify, according to reception of a request command for requesting transmission of information indicating a state of the information equipment, notifies the control apparatus of an operation route identifier indicating the route type of the operational instruction received before the request command is received.

In the first aspect, the variable indicating the route type includes a variable indicating an inside-consumer's facility operation in which an operation is input to the information equipment from an operation apparatus connected to a narrow area network installed in the consumer's facility and a variable indicating an outside-consumer's facility operation in which an operation is input to the information equipment from an operation apparatus connected to a wide area network different from the narrow area network.

In the first aspect, the variable indicating the inside-consumer's facility operation includes a variable indicating a direction operation in which an operation is directly input to the information equipment without intervention of another equipment and a variable indicating an indirection operation in which an operation is indirectly input to the information equipment via another equipment.

A control system according to second aspect comprises information equipment that is located in a consumer's facility and a control apparatus that controls the information equipment. The information equipment includes a storage unit configured to store a variable indicating a route type of an operational instruction on the information equipment.

A control method according to third aspect used in a control system including information equipment that is located in a consumer's facility and a control apparatus that controls the information equipment. The control method comprises a step of storing, by the information equipment, a variable indicating a route type of an operational instruction on the information equipment.

BRIEF DESCRIPTION OF THE DRAWINGS

FIG. 6 is a diagram illustrating an exemplary message format according to the first embodiment.

FIG. 7 is a diagram illustrating an exemplary message format according to the first embodiment.

DESCRIPTION OF EMBODIMENTS

Figure 1:
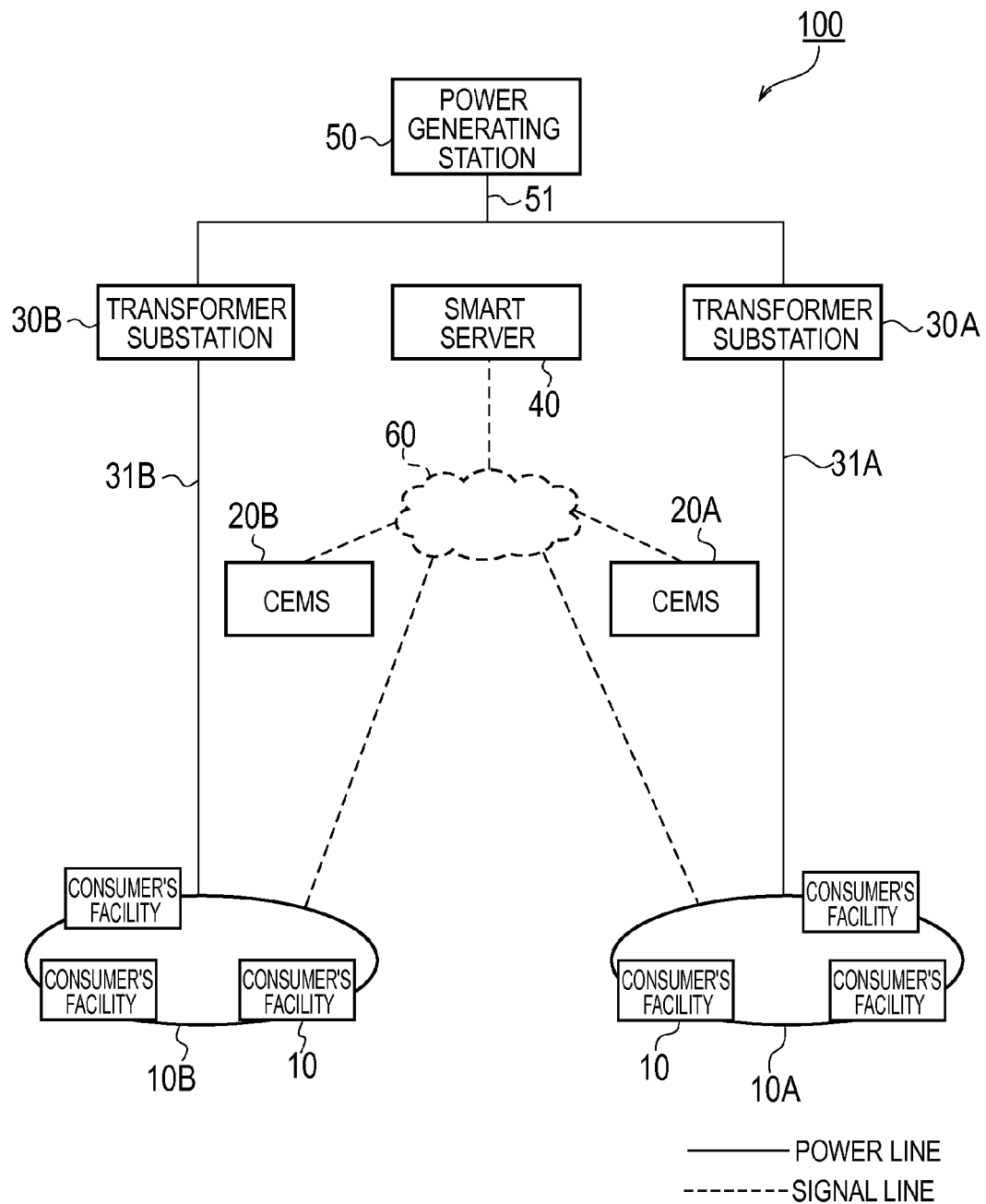
FIG. 1 is a diagram illustrating an energy management system 100 according to a first embodiment.

Hereinafter, a control system and a control method according to an exemplary embodiment of the present invention will be described with reference to the appended drawings. In the following drawings, the same or similar parts are denoted by the same or similar reference numerals.

There are schematic diagrams, and it should be noted that a ratio of each dimension or the like is different from an actual one. Thus, a specific dimension or the like has to be determined in view of the following description. Of course, portions that differ in a relation of dimensions or a ratio are included in the drawings.

[Overview of Embodiment]

Information equipment according to embodiment is controlled by a control apparatus and located in a consumer's facility. The information equipment comprises a storage unit configured to store a variable indicating a route type of an operational instruction on the information equipment.

In the embodiment, since the variable indicating the route type of the operational instruction on the information equipment is stored in the information equipment, it is possible to control the information equipment using the variable indicating the route type. Thus, it is possible to remotely control the information equipment while considering problems in safety.

[First Embodiment]

(Energy Management System)

Hereinafter, an energy measurement system according to a first embodiment will be described. FIG. 1 is a diagram illustrating the energy management system 100 according to the first embodiment.

As illustrated in FIG. 1, the energy management system 100 is configured to include a consumer's facility 10, a CEMS 20, a substation 30, a smart server 40, and a power plant 50. The consumer's facility 10, the CEMS 20, the substation 30, and the smart server 40 are connected to each other via a wide area network 60.

The consumer's facility 10 is an example of the consumer's facility including at least one of a distributed power apparatus, a power storage apparatus, a thermal storage apparatus, and a load. The distributed power apparatus, the power storage apparatus, the thermal storage apparatus, and the load are an example of the information equipment controlled by the control apparatus.

The distributed power apparatus is an apparatus generating power by using natural energy such as solar light, wind power, or geothermal power like a solar cell or the like. Otherwise, the distributed power apparatus is an apparatus generating power by using fuel gas like a fuel cell. The power storage apparatus is an apparatus storing power, for example, like a secondary battery or the like. The thermal storage apparatus is an apparatus converting power to heat and storing the heat, for example, like a water heater or the like. The load is a refrigerator, an illuminator, an air conditioner, a TV, or the like.

The consumer's facility 10 may be, for example, a detached residence, may be a housing complex such as an apartment house, may be a commercial facility such as a building, may be a factory, or may be a store.

In the first embodiment, a consumer's facility group 10A and a consumer's facility group 10B are configured with a plurality of the consumer's facilities 10. The consumer's facility group 10A and the consumer's facility group 10B are classified, for example, according to a geographical area.

The CEMS 20 controls connection between the plurality of the consumer's facilities 10 and a power grid. Since the CEMS 20 manages the plurality of the consumer's facilities 10, the CEMS is sometimes referred to as a CEMS (cluster energy management system). More specifically, during a power failure or the like, the CEMS 20 disconnects the connection between the plurality of the consumer's facilities 10 and the power grid. On the other hand, at the restoration of power or the like, the CEMS 20 connects the plurality of the consumer's facilities 10 and the power grid.

In the first embodiment, a CEMS 20A and a CEMS 20B are installed. The CEMS 20A controls, for example, the connection between the consumer's facilities 10 included in the consumer's facility group 10A and the power grid. The CEMS 20B controls, for example, the connection between the consumer's facilities 10 included in the consumer's facility group 10B and the power grid.

The substation 30 supplies power to the plurality of the consumer's facilities 10 through a distribution line 31. More specifically, the substation 30 steps down a voltage supplied from the power plant 50.

In the first embodiment, a substation 30A and a substation 30B are installed. The substation 30A supplies power, for example, to the consumer's facilities 10 included in the consumer's facility group 10A through a distribution line 31A. The substation 30B supplies power, for example, to the consumer's facilities 10 included in the consumer's facility group 10B through a distribution line 31B.

The smart server 40 manages the plurality of the CEMSs 20 (herein, the CEMS 20A and the CEMS 20B). The smart server 40 manages the plurality of the substations 30 (herein, the substation 30A and the substation 30B). In other words, the smart server 40 collectively manages the consumer's facilities 10 included in the consumer's facility group 10A and the consumer's facility group 10B. The smart server 40 has a function of balancing, for example, the power supplied to the consumer's facility group 10A and the power supplied to the consumer's facility group 10B.

The power plant 50 performs power generation using firepower, wind power, hydropower, nuclear power, or the like. The power plant 50 supplies power to the plurality of the substations 30 (herein, the substation 30A and the substation 30B) through a power transmission line 51.

The wide area network 60 is connected to each apparatus via a signal line. The wide area network 60 is, for example, the Internet, a mobile phone network, or the like.

(Consumer's Facility)

Figure 2:
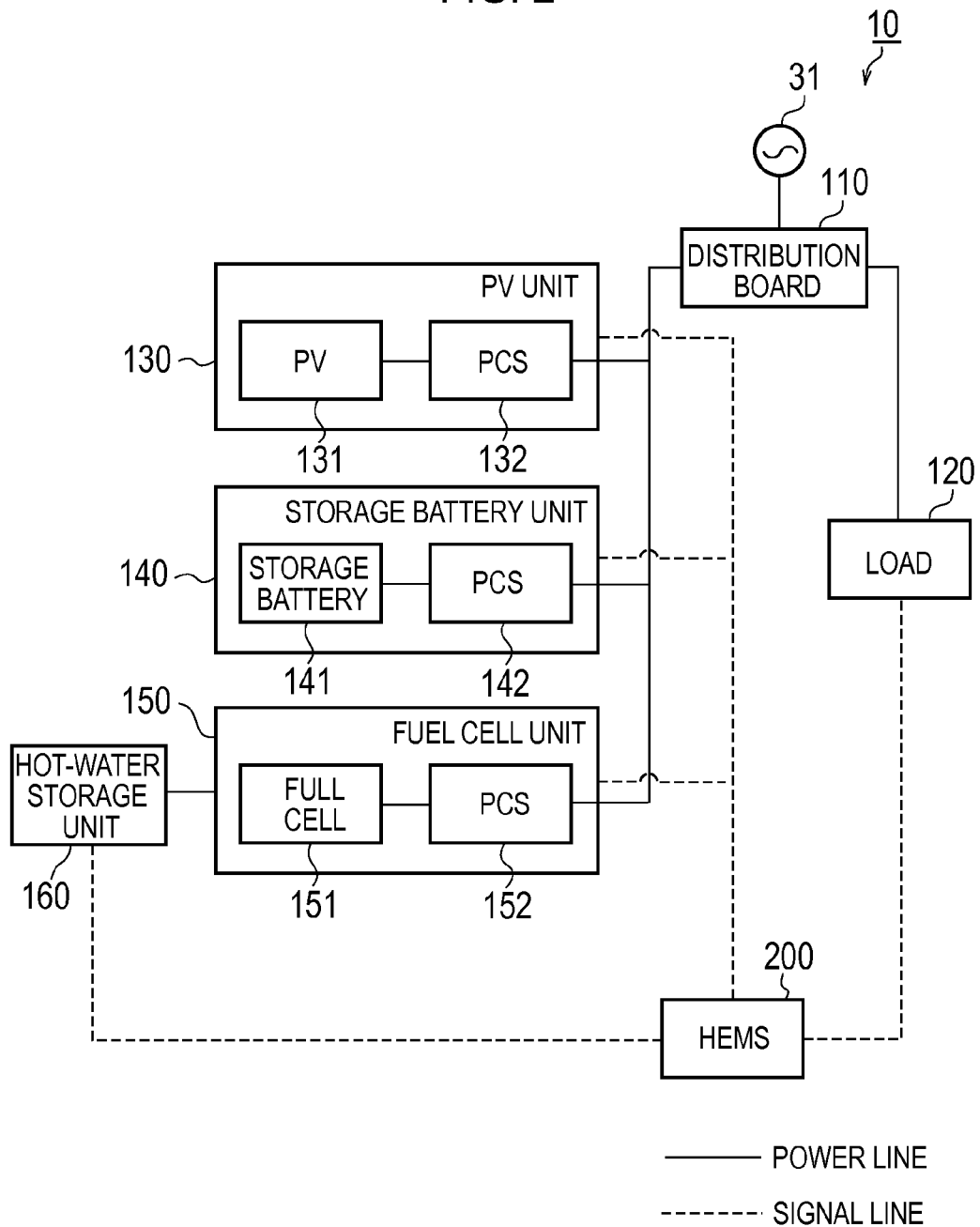
FIG. 2 is a diagram illustrating a consumer's facility 10 according to the first embodiment.

Hereinafter, the consumer's facility according to the first embodiment will be described. FIG. 2 is a diagram illustrating details of the consumer's facility 10 according to the first embodiment.

As illustrated in FIG. 2, the consumer's facility 10 is configured to include a distribution board 110, a load 120, a PV unit 130, a storage battery unit 140, a fuel cell unit 150, a hot-water storage unit 160, and an HEMS 200.

The distribution board 110 is connected to the distribution line 31 (grid). The distribution board 110 is connected to the load 120, the PV unit 130, the storage battery unit 140, and the fuel cell unit 150 through a power line.

The distribution board 110 may include a measurement unit measuring the power supplied from the distribution line 31 (grid). The measurement unit may measure power consumption of the load 120.

The load 120 is an apparatus consuming the power supplied through the power line. For example, the load 120 includes an apparatus such as a refrigerator, an illuminator, an air conditioner, or a TV. The load 120 may include a single apparatus or a plurality of apparatuses.

The PV unit 130 includes a PV 131 and a PCS 132. The PV 131 is an example of the distributed power apparatus and is an apparatus performing power generation according to reception of solar light. The PV 131 outputs a DC power as a result of the power generation. An amount of power generation of the PV 131 changes according to an amount of solar radiation irradiated on the PV 131. The PCS 132 is an apparatus (power conditioning system) converting the DC power output from the PV 131 to an AC power. The PCS 132 outputs the AC power to the distribution board 110 through the power line.

The PV unit 130 may include a pyrheliometer measuring the amount of solar radiation irradiated on the PV 131.

The PV unit 130 is controlled by an MPPT (maximum power point tracking) method. More specifically, the PV unit 130 optimizes an operating point (point determined by a voltage value and a power value at the operating point or point determined by a voltage value and a current value at the operating point) of the PV 131.

The storage battery unit 140 is configured to include a storage battery 141 and a PCS 142. The storage battery 141 is an apparatus storing power. The PCS 142 is an apparatus (power conditioning system) converting a DC power output from the storage battery 141 to an AC power.

The fuel cell unit 150 is configured to include a fuel cell 151 and a PCS 152. The fuel cell 151 is an example of the distributed power apparatus and is an apparatus generating power by using a fuel gas. The PCS 152 is an apparatus (power conditioning system) converting a DC power output from the fuel cell 151 to an AC power.

The fuel cell unit 150 operates according to load-following control. More specifically, the fuel cell unit 150 controls the fuel cell 151 so that the power output from the fuel cell 151 follows the power consumption of the load 120.

The hot-water storage unit 160 is an example of the thermal storage apparatus converting power to heat and storing the heat. More specifically, the hot-water storage unit 160 includes a hot-water storage tank to warm water supplied from the hot-water storage tank by exhaust heat generated from operation (power generation) of the fuel cell 151. More specifically, the hot-water storage unit 160 warms the water supplied from the hot-water storage tank and returns the warm water to the hot-water storage tank.

The HEMS 200 is a control apparatus managing the information equipment (load, distributed power apparatus, power storage apparatus or thermal storage apparatus) located in the consumer's facility 10.

In the first embodiment, the HEMS 200 is connected to the load 120, the PV unit 130, the storage battery unit 140, the fuel cell unit 150, and the hot-water storage unit 160 through a signal line and controls the load 120, the PV unit 130, the storage battery unit 140, the fuel cell unit 150, and the hot-water storage unit 160. The HEMS 200 may control power consumption of the load 120 by controlling an operation mode of the load 120. The signal line connecting the HEMS 200 and the information equipment may be in a wireless or may be in a wired manner.

The HEMS 200 is connected to various servers via the wide area network 60. The various servers store, for example, information (hereinafter, referred to as energy fee information) such as a purchase unit price of the power supplied from the grid, a sale unit price of the power supplied from the grid, and a purchase unit price of the fuel gas.

In addition, the various servers store, for example, information (hereinafter, referred to as energy consumption forecasting information) for forecasting power consumption of the load 120. The energy consumption forecasting information may be generated, for example, based on actual records of the previous power consumption of the load 120. Alternatively, the energy consumption forecasting information may be a model of the power consumption of the load 120.

The various servers store, for example, information (hereinafter, referred to as PV power generation amount forecast information) for forecasting the amount of power generation of the PV 131. The PV power generation forecast information may be a forecast value of the amount of solar radiation irradiated on the PV 131. Alternatively, the PV power generation forecast information may be weather forecast, season, daylight hours, or the like.

(Applicable Scene)

Figure 3:
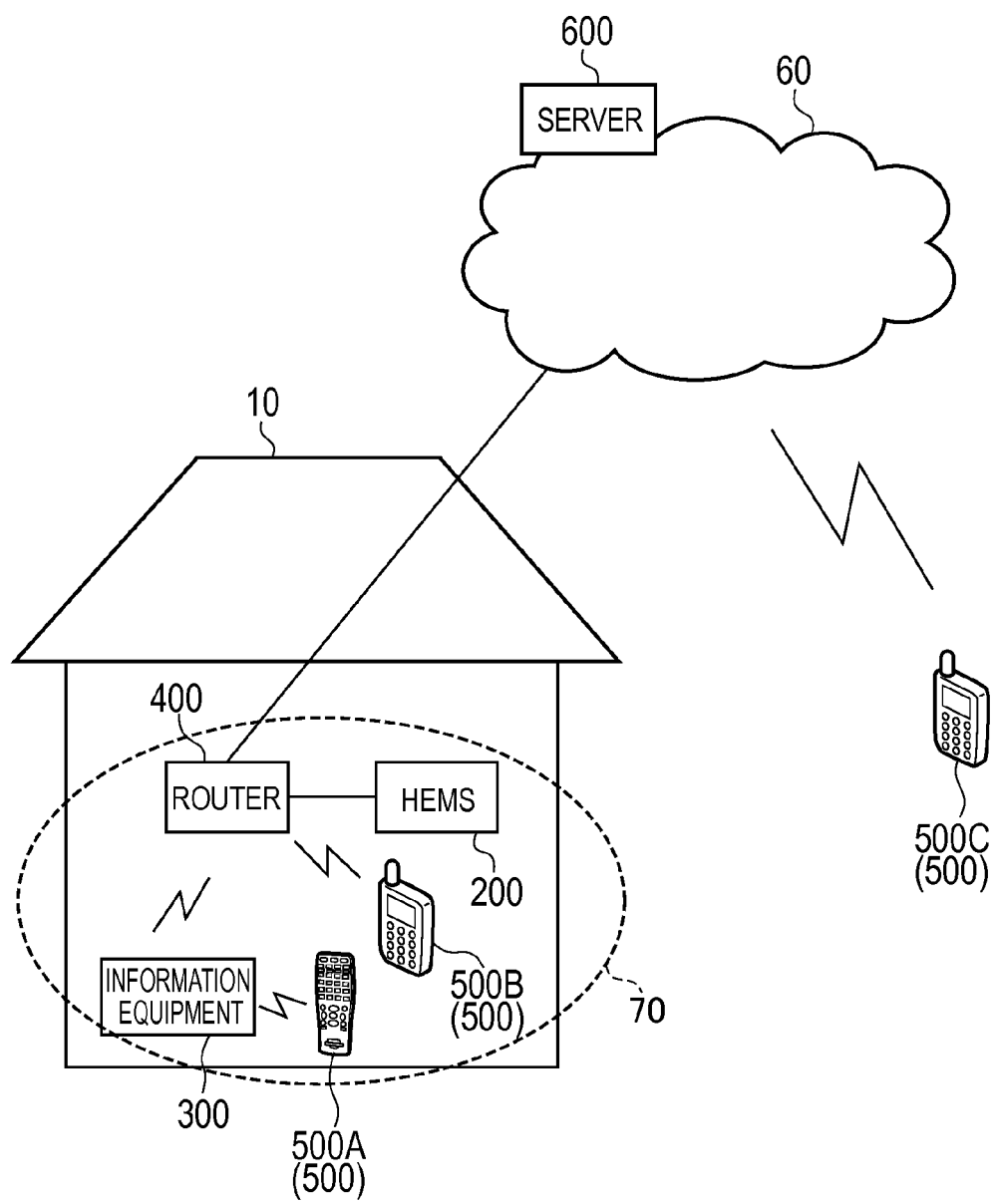
FIG. 3 is a diagram illustrating an application scene according to the first embodiment.

Hereinafter, an applicable scene of the first embodiment will be described. FIG. 3 is a diagram illustrating the applicable scene of the first embodiment.

As illustrated in FIG. 3, a system according to the applicable scene of the first embodiment is configured to include an HEMS 200, information equipment 300, a router 400, an operation terminal 500, and a server 600.

The HEMS 200 is an example of the control apparatus managing the information equipment 300 located in the consumer's facility 10. The HEMS 200 is connected to the router 400 in a wired or wireless manner and communicates with the information equipment 300, the operation terminal 500, and the server 600 through the router 400.

The information equipment 300 is controlled by the HEMS 200 like the load 120, the PV unit 130, the storage battery unit 140, the fuel cell unit 150, the hot-water storage unit 160, or the like.

The router 400 constitutes a narrow area network 70 installed in the consumer's facility 10. The router 400 may constitute a wireless LAN or a wired LAN as the narrow area network 70. FIG. 3 exemplarily illustrates a case where the HEMS 200 is connected to the router 400 in a wired manner and the information equipment 300 and the operation terminal 500 are connected to the router 400 in a wireless manner. However, the HEMS 200 may be connected to the router 400 in a wireless manner, and the information equipment 300 and the operation terminal 500 may be connected to the router 400 in a wired manner.

The operation terminal 500 is an operation terminal transmitting an operational instruction for the information equipment 300. The operation terminal 500 may be an operation terminal (for example, a remote controller or an operation button installed in the information equipment 300) directly inputting operation into the information equipment 300 without use the router 400 or the HEMS 200. Alternatively, the operation terminal 500 may be an operation terminal (for example, a mobile terminal connected to the router 400 in a wireless manner or a personal computer connected to the router 400 in a wired manner) connected to the narrow area network 70. The operation terminal connected the narrow area network 70 indirectly inputs operation to the information equipment 300 through the router 400 and the HEMS 200. In addition, the operation terminal 500 may be an operation terminal (for example, a mobile terminal capable of accessing the server 600 or a personal computer capable of accessing the server 600) connected to a wide area network 60 different from the narrow area network 70. The operation terminal connected to the wide area network 60 is not limited to an apparatus carried by a user, but it may be a server (for example, a server managed by a power company) installed on the wide area network 60. As the operational instruction transmitted from such a server, there is considered a demand response or the like.

In FIG. 3, as the operation terminal 500, an operation terminal 500A directly inputting operation into the information equipment 300, an operation terminal 500B connected to the narrow area network 70, and an operation terminal 500C connected to the wide area network 60 are exemplarily illustrated. In a case where the operational instruction is a demand response or the like, it should be noted that the operation terminal 500C may be considered to be same as the server 600. For example, the server 600 may be the above-described smart server 40, and the demand response issued from the smart server 40 may be an operational instruction.

The server 600 is a server which is installed on the wide area network 60 and receives an operational instruction for the information equipment 300 from the operation terminal 500C connected to the wide area network 60. However, it should be noted that the operation terminal 500C is not always connected to the server 600.

Herein, in terms of security, it is not preferable that session between the HEMS 200 connected to the narrow area network 70 installed in the consumer's facility 10 and the server 600 be always retained. In general, in order to protect an apparatus connected to the narrow area network 70, a firewall is installed between the wide area network 60 and the narrow area network 70. Therefore, access from the server 600 to the HEMS 200 cannot be arbitrarily performed. From such a point of view, it is preferable that the server 600 transmit the operational instruction received from the operation terminal 500C to the HEMS 200 according to a query periodically executed by the HEMS 200 with respect to the server 600.

However, the embodiment is not limited thereto. For example, port releasing is intentionally performed on the firewall, so that the server 600 may transmit to the HEMS 200 the operational instruction received from the operation terminal 500C at an arbitrary timing.

(Control Apparatus)

Figure 4:
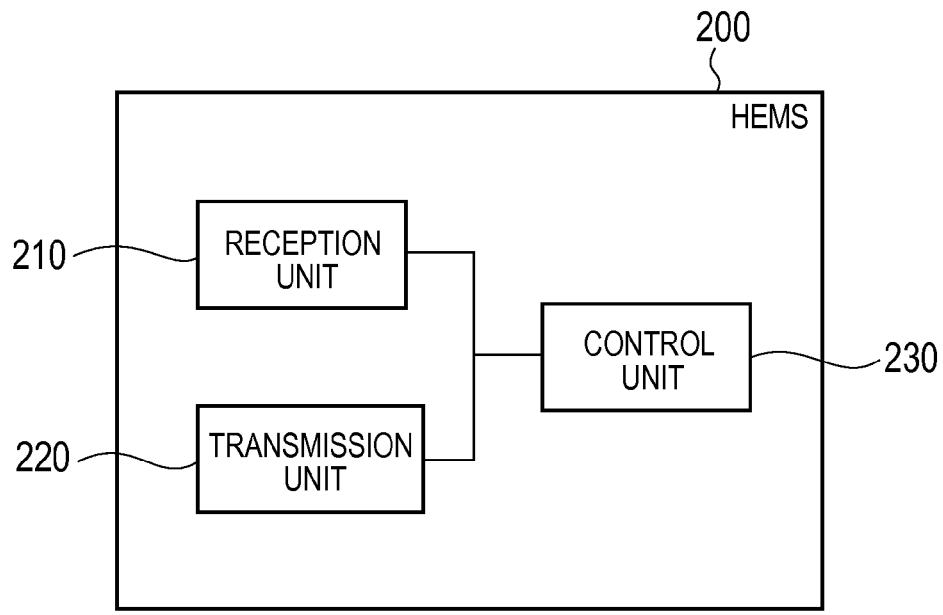
FIG. 4 is a diagram illustrating a HEMS 200 according to the first embodiment.

Hereinafter, the control apparatus according to the first embodiment will be described. FIG. 4 is a block diagram illustrating the HEMS 200 according to the first embodiment.

As illustrated in FIG. 4, the HEMS 200 is configured to include a reception unit 210, a transmission unit 220, and a control unit 230.

The reception unit 210 receives various signals from the apparatuses connected through the signal line (wireless or wired). For example, the reception unit 210 receives information indicating an amount of power generation of the PV 131 from the PV unit 130. The reception unit 210 receives information indicating an amount of electricity storage of the storage battery 141 from the storage battery unit 140. The reception unit 210 receives information indicating an amount of power generation of the fuel cell 151 from the fuel cell unit 150. The reception unit 210 receives information indicating an amount of hot water storage of the hot-water storage unit 160 from the hot-water storage unit 160.

In a case where communication between the HEMS 200 and the information equipment 300 is performed in an ECHONET Lite protocol, the reception unit 210 receives a message (SET response command, GET response command, and INFO command) in accordance with the ECHONET Lite protocol from each apparatus. The SET response command is a response command with respect to a setting command (SET command) including an operational instruction for the information equipment 300 and includes a set response indicating a result of the setting (refer to FIG. 8 described later). The GET response command is a response command with respect to a request command (GET command) demanding to transmit information indicating a state of the information equipment 300 and includes demanded information (demand response) (refer to FIG. 9 described later). The INFO command is a command which the information equipment 300 spontaneously transmits independently of a command from the HEMS 200 with respect to the information equipment 300 and includes the state information indicating the state of the information equipment 300 (refer to FIG. 10 described later).

Herein, the reception unit 210 may receive the energy fee information, the energy consumption forecasting information, and the PV power generation amount forecast information from various servers via the wide area network 60. However, the energy fee information, the energy consumption forecasting information, and the PV power generation amount forecast information may be stored in the HEMS 200 in advance.

In the first embodiment, the reception unit 210 receives the operational instruction (inside-consumer's-facility operation) from the operation terminal 500B. In addition, the reception unit 210 receives the operational instruction (outside-consumer's-facility operation) received from the operation terminal 500C from the server 600.

The transmission unit 220 transmits various signals to apparatuses connected through the signal line. For example, the transmission unit 220 transmits signals for controlling the load 120, the PV unit 130, the storage battery unit 140, the fuel cell unit 150 and the hot-water storage unit 160 to the respective apparatuses.

In a case where communication between the HEMS 200 and the information equipment 300 is performed in an ECHONET Lite protocol, the transmission unit 220 transmits a message (SET command and GET command) in accordance with the ECHONET Lite protocol to each apparatus. The SET command is a setting command including an operational instruction for the information equipment 300 (refer to FIG. 6 or 7 described later). The GET command is a request command requesting to transmit information indicating a state of the information equipment 300.

In the first embodiment, the transmission unit 220 transmits a query of the operational instruction received from the operation terminal 500C to the server 600.

In the first embodiment, the transmission unit 220 constitutes a transmission unit which transmits an operational instruction for the information equipment 300 to the information equipment 300. The route type of the operational instruction for the information equipment 300 includes inside-consumer's-facility operation in which the operation terminal 500B connected to the narrow area network 70 inputs operations to the information equipment 300 and outside-consumer's-facility operation in which the operation terminal 500C connected to the wide area network 60 inputs operations to the information equipment 300.

Herein, in a case where the route type is the inside-consumer's-facility operation, the transmission unit 220 transmits an operational instruction in a first format. On the other hand, in a case where the route type is the outside-consumer's-facility operation, the transmission unit 220 transmits an operational instruction in a second format different from the first format.

In a case where communication between the HEMS 200 and the information equipment 300 is performed in an ECHONET Lite protocol, as illustrated in FIG. 6, as the operational instruction in the first format, an existing message (SET command) in an ECHONET Lite protocol can be used. On the other hand, the operational instruction in the second format is a newly defined message (special SET command) apart from the existing message in the ECHONET Lite protocol. For example, the SET command (second format) includes operation-route specifying information indicating that the route type is outside-consumer's-facility operation. In the example illustrated in FIG. 6, the SET command (first format) is an existing message which does not include operation-route specifying information.

Otherwise, as illustrated in FIG. 7, the first format and the second format may be distinguished from each other by the operation-route specifying information (for example, 1-bit flag) indicating the route type. The SET command (first format) includes operation-route specifying information indicating that the route type is inside-consumer's-facility operation, and the SET command (second format) includes operation-route specifying information indicating that the route type is outside-consumer's-facility operation.

Returning to FIG. 4, the control unit 230 controls operations of the HEMS 200. The control unit 230 controls the load 120, the PV unit 130, the storage battery unit 140, the fuel cell unit 150, and the hot-water storage unit 160.

In the first embodiment, the control unit 230 constitutes a determination unit which determines a route type of the operational instruction for the information equipment 300. More specifically, in a case where the operational instruction does not pass through the server 600 installed on the wide area network 60, the control unit 230 determines that the route type is the inside-consumer's-facility operation. On the other hand, in a case where the operational instruction passes through the server 600 installed on the wide area network 60, the control unit 230 determines that the route type is the outside-consumer's-facility operation.

As described above, in a case where the route type is the inside-consumer's-facility operation, the operational instruction is transmitted from the operation terminal 500B to the HEMS 200 through the router 400. Therefore, if the control unit 230 identifies the IP address of the transmission source of the operational instruction, the control unit 230 can determine that the operational instruction does not pass through the server 600. On the other hand, in a case where the route type is the outside-consumer's-facility operation, the operational instruction which the server 600 receives from the operation terminal 500C is transmitted from the server 600 to the HEMS 200. Therefore, if the control unit 230 identifies the IP address of the transmission source of the operational instruction, the control unit 230 can determine that the operational instruction passes through the server 600.

Namely, the control unit 230 is considered to determine the route type of the operational instruction according to whether or not the operational instruction is based on an instruction passing through the wide area network 60. In a case where the operational instruction is based on an instruction passing through the wide area network 60, the control unit 230 determines that the route type is outside-consumer's-facility operation. In a case where the operational instruction is not based on an instruction passing through the wide area network 60, the control unit 230 determines that the route type is inside-consumer's-facility operation.

Herein, the instruction passing through the wide area network 60 may be an instruction transmitted from the operation terminal 500C directly to the HEMS 200 or may be an instruction transmitted from the operation terminal 500C through the server 600 to the HEMS 200. Otherwise, the instruction passing through the wide area network 60 may be an instruction transmitted from the above-described smart server 40 to the HEMS 200. The control unit 230 may also transmit an appropriate operational instruction to the information equipment 300 according to the instruction passing through the wide area network 60.

As described above, in a case where the route type is inside-consumer's-facility operation, the transmission unit 220 transmits the operational instruction in the first format. In a case where the route type is outside-consumer's-facility operation, the transmission unit 220 transmits the operational instruction in the second format. If the above-described determination method of the control unit 230 is taken into consideration, the transmission unit 220 may be considered to transmit the operational instruction in different formats according to whether or not the operational instruction passes through the server 600 located outside the consumer's facility 10. Otherwise, the transmission unit 220 may be considered to transmit the operational instruction in different formats according to whether or not the operational instruction is based on an instruction passing though the wide area network 60.

(Information Equipment)

Figure 5:
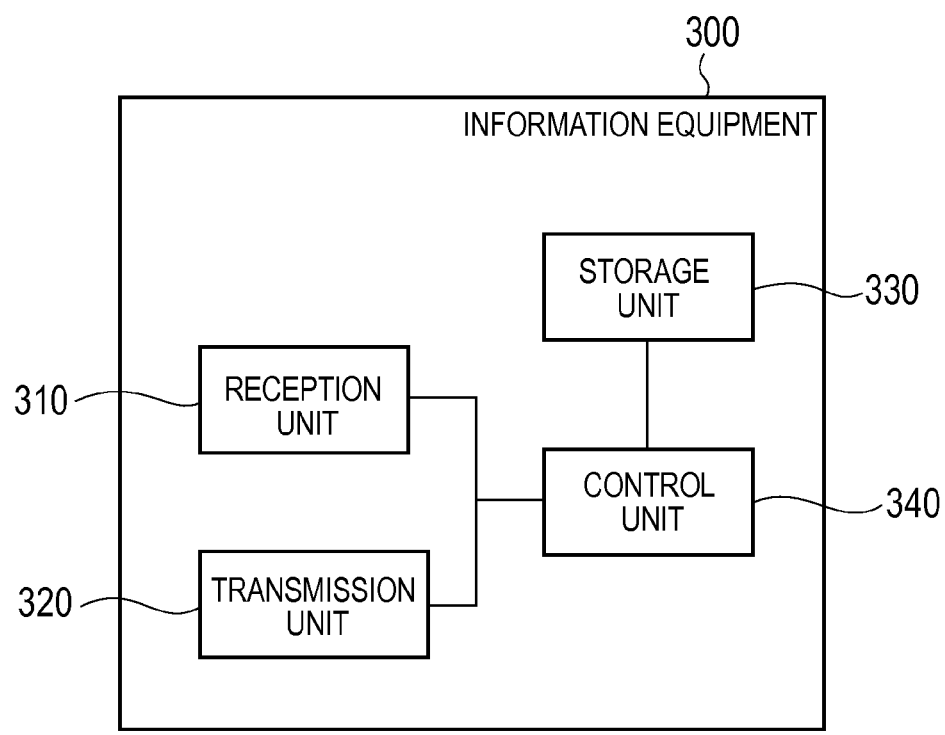
FIG. 5 is a diagram illustrating information equipment 300 according to the first embodiment.

Information equipment according to the first embodiment will be described below. FIG. 5 describes the information equipment 300 according to the first embodiment.

As illustrated in FIG. 5, the information equipment 300 is configured to include a reception unit 310, a transmission unit 320, a storage unit 330, and a control unit 340.

The reception unit 310 receives various signals from the apparatuses connected through the signal line (wireless or wired). More specifically, the reception unit 310 receives operational instructions from the operation terminal 500A, the operation terminal 500B, and the operation terminal 500C.

In a case where communication between the HEMS 200 and the information equipment 300 is performed in an ECHONET Lite protocol, the reception unit 310 receives a message (SET command and GET command) in accordance with the ECHONET Lite protocol from the HEMS 200.

In the first embodiment, in a case where the route type is inside-consumer's-facility operation, the reception unit 310 receives the operational instruction in the first format from the HEMS 200. On the other hand, in a case where the route type is outside-consumer's-facility operation, the reception unit 310 receives the operational instruction in the second format different from the first format from the HEMS 200.

The transmission unit 320 transmits various signals to apparatuses connected through the signal line (wireless or wired).

In a case where communication between the HEMS 200 and the information equipment 300 is performed in an ECHONET Lite protocol, the transmission unit 320 transmits a message (SET response command, GET response command, and INFO command) in accordance with the ECHONET Lite protocol to the HEMS 200.

In the first embodiment, the transmission unit 320 constitutes a notifying unit which notifies the HEMS 200 of an operational instruction indicating the route type of the operational instruction for the information equipment.

Figure 8:
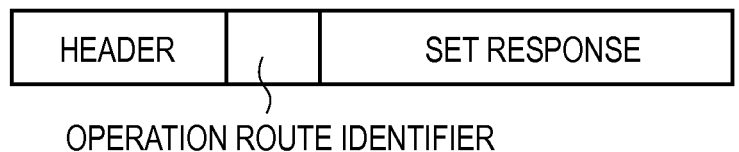
FIG. 8 is a diagram illustrating an exemplary message format according to the first embodiment.

More specifically, according to the reception of the setting command including an operational instruction for the information equipment 300, the transmission unit 320 notifies the HEMS 200 of an operation-route identifier indicating a route type of the operational instruction included in the setting command. For example, as illustrated in FIG. 8, according to the reception of the SET command, the transmission unit 320 transmits to the HEMS 200 a SET response command including the operation-route identifier indicating the route type of the operational instruction included in the SET command.

Figure 9:
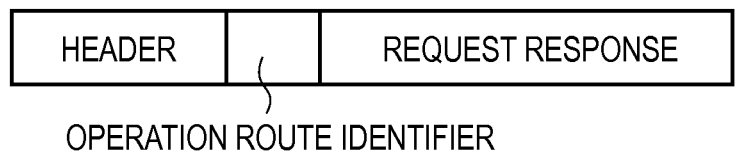
FIG. 9 is a diagram illustrating an exemplary message format according to the first embodiment.

Otherwise, according to the reception of the request command requesting to transmit information indicating a state of the information equipment 300, the transmission unit 320 notifies the HEMS 200 of an operation-route identifier indicating a route type of the operational instruction received before the reception of the request command. For example, as illustrated in FIG. 9, according to the reception of the GET command, the transmission unit 320 transmits to the HEMS 200 a GET response command including the operation-route identifier indicating the route type of the operational instruction received before the reception of the GET command. Namely, the transmission unit 320 transmits to the HEMS 200 the GET response command including the operation-route identifier indicating which operation route the current operation is received from.

Figure 10:
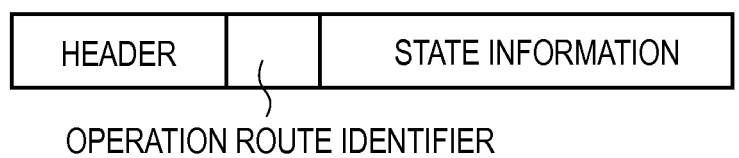
FIG. 10 is a diagram illustrating an exemplary message format according to the first embodiment.

Otherwise, in a case where the variable stored in the storage unit 330 is changed, the transmission unit 320 notifies the HEMS 200 of an operation-route identifier indicating a changed variable. For example, as illustrated in FIG. 10, the transmission unit 320 transmits to the HEMS 200 an INFO command including the operation-route identifier indicating the changed variable.

The storage unit 330 stores variables indicating the route type of the operational instruction for the information equipment 300.

As described above, the variables indicating the route type of the operational instruction for the information equipment 300 include a variable indicating inside-consumer's-facility operation where the operation terminal 500B connected to the narrow area network 70 installed in the consumer's facility 10 input operation to the information equipment 300 and a variable indicating outside-consumer's-facility operation where the operation terminal 500C connected to the wide area network 60 different from the narrow area network 70 inputs operation to the information equipment 300.

In addition, the variable indicating the inside-consumer's-facility operation may include a variable indicating direct operation where operation is directly input to the information equipment 300 without passing through a different apparatus (for example, HEMS 200 or router 400) and a variable indicating indirect operation where operation is indirectly input to the information equipment 300 through a different apparatus (for example, HEMS 200 or router 400).

The direct operation may be operation of operation buttons installed in the information equipment 300 or may be operation using a remote controller associated with the information equipment 300. The indirect operation is an operation using the operation terminal 500B connected to the narrow area network 70 installed in the consumer's facility 10.

The control unit 340 controls operations of the information equipment 300. More specifically, the control unit 340 controls the operations of the information equipment 300 according to an operational instruction.

In the first embodiment, the control unit 340 determines an operational instruction route type. The control unit 340 can specify the inside-consumer's-facility operation and the outside-consumer's-facility operation according to a difference between the formats of the messages including the operational instructions. In addition, since the control unit 340 can specify the direct operation, the control unit 340 can specify operation other than the direct operation. Therefore, the control unit 340 can specify that the inside-consumer's-facility operation is direct operation and can also specify that the inside-consumer's-facility operation is indirect operation.

(Control Method)

Figure 11:
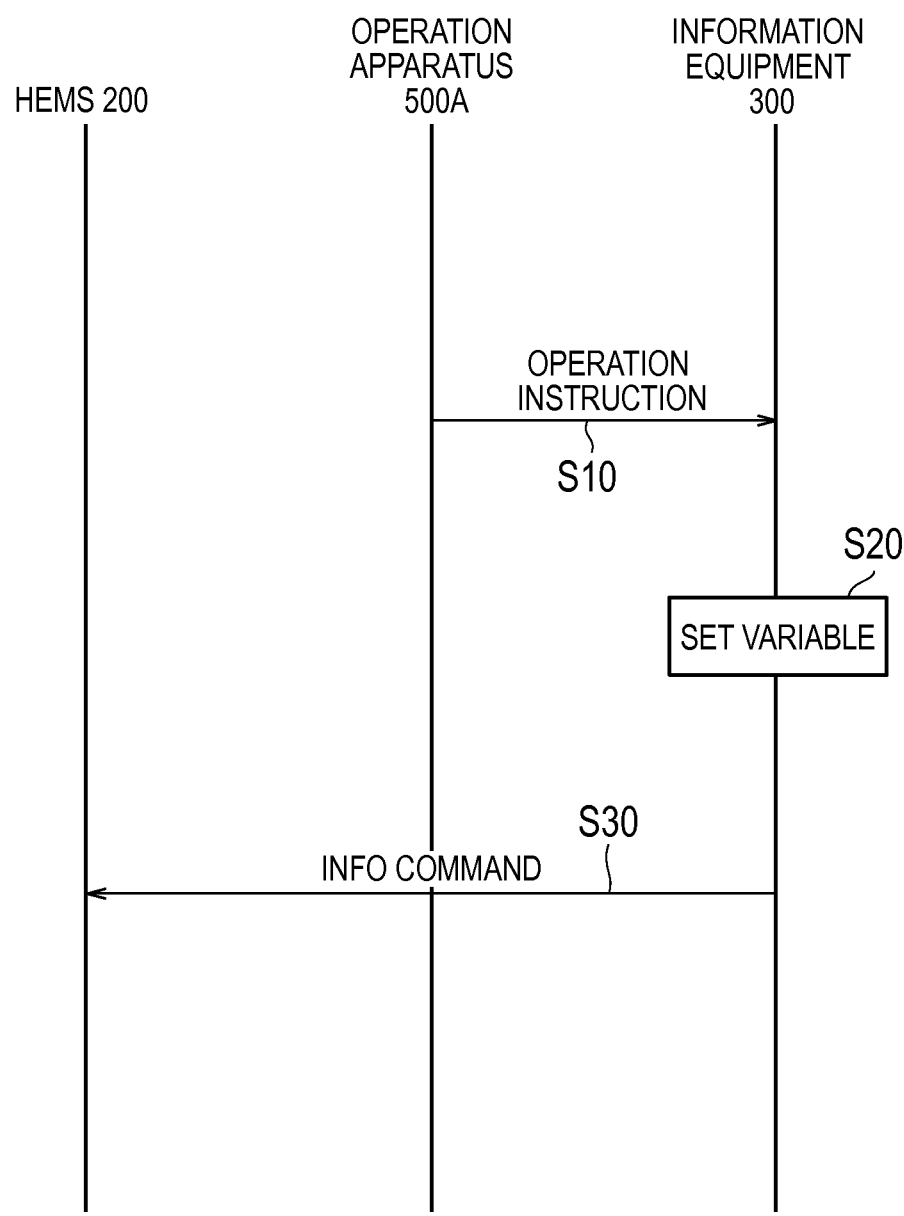
FIG. 11 is a sequence diagram illustrating a control method according to the first embodiment.
Figure 12:
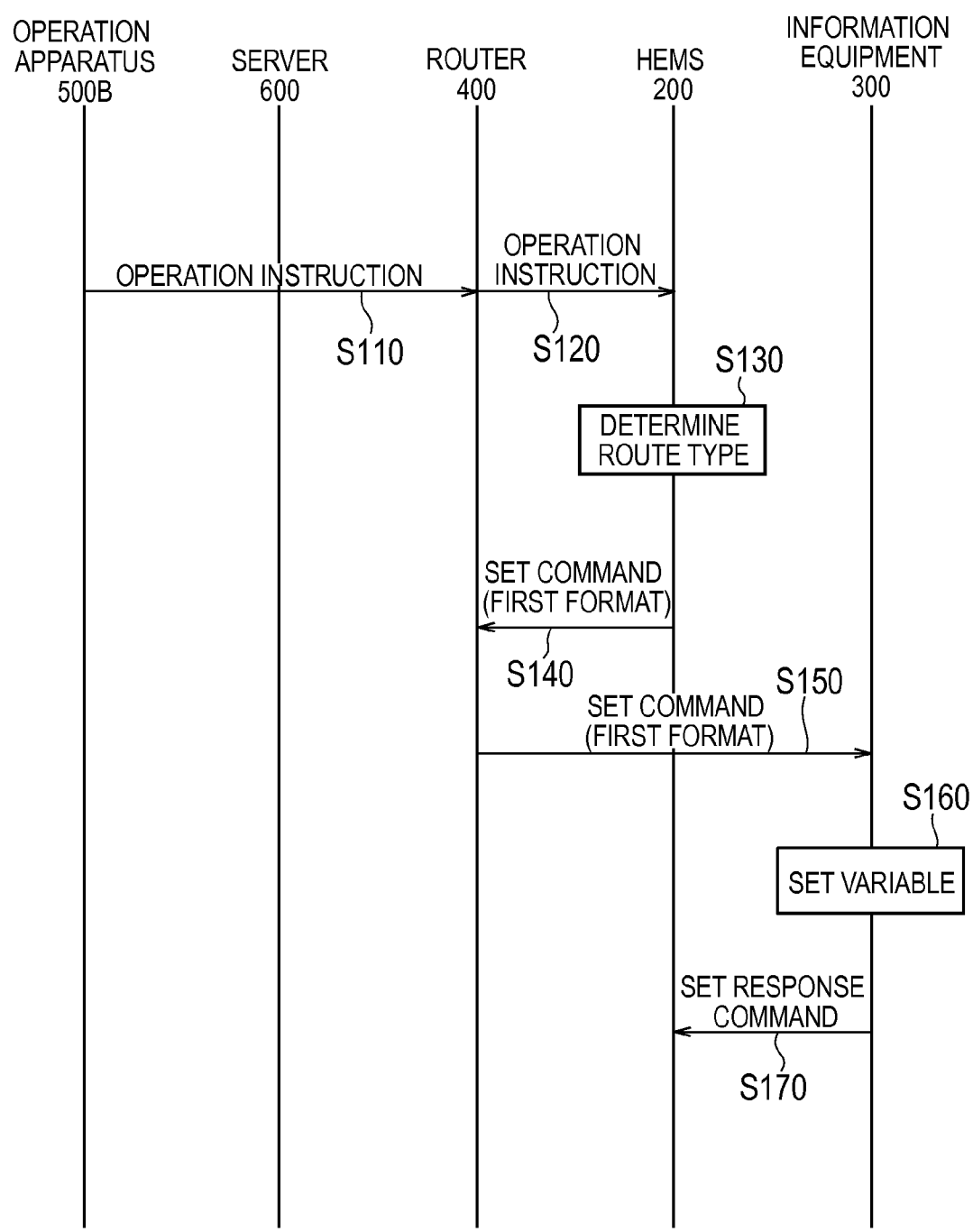
FIG. 12 is a sequence diagram illustrating a control method according to the first embodiment.
Figure 13:
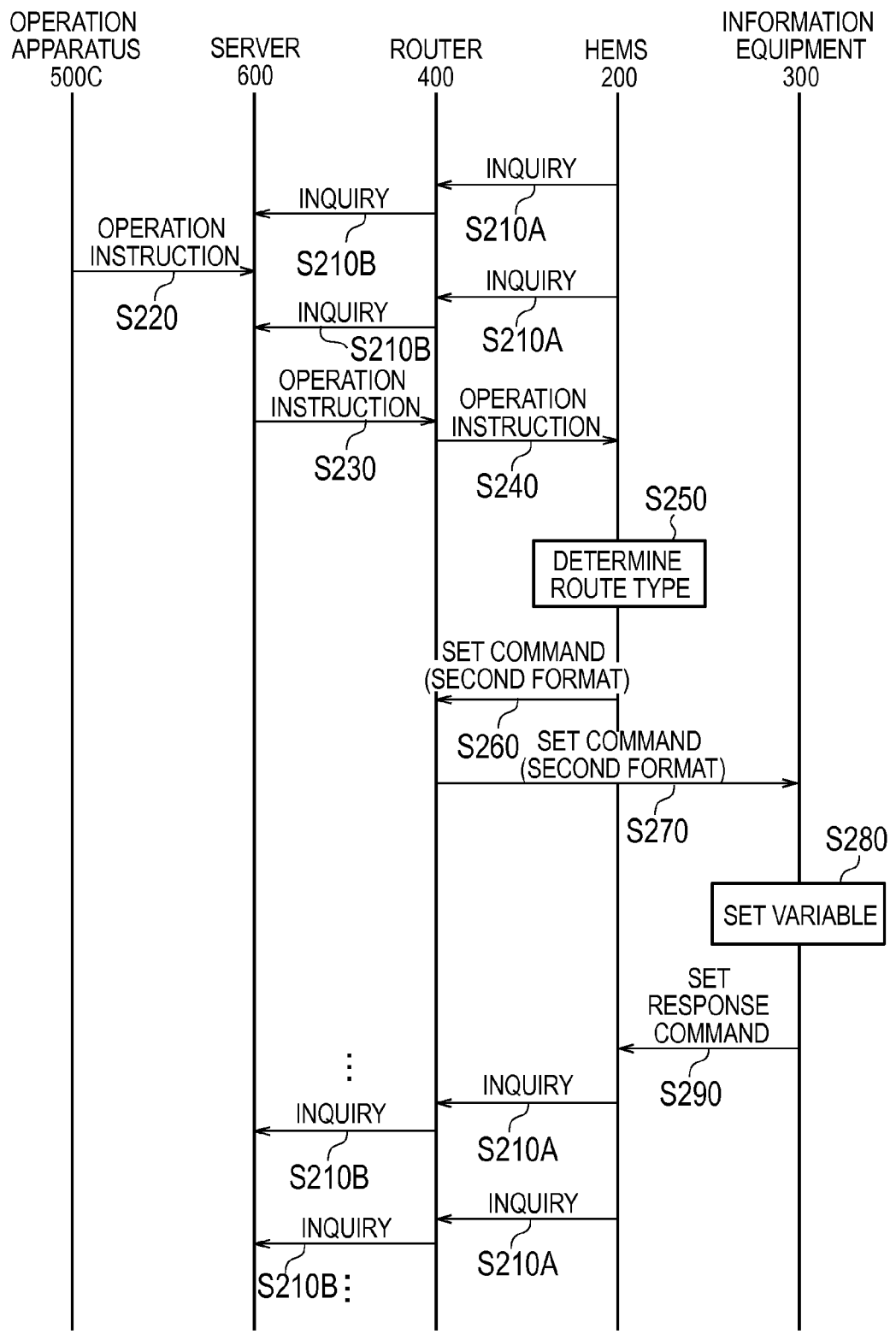
FIG. 13 is a sequence diagram illustrating a control method according to the first embodiment.

Hereinafter, a control method according to the first embodiment will be described. FIGS. 11 to 13 are flowcharts illustrating the control method according to the first embodiment. In FIGS. 11 to 13, a case where communication between the HEMS 200 and the information equipment 300 is performed in accordance with the ECHONET Lite protocol is exemplified.

Firstly, the case (direct operation) where an operational instruction is transmitted from the operation terminal 500A to the information equipment 300 will be described with reference to FIG. 11.

As illustrated in FIG. 11, in step 10, the operation terminal 500A transmits the operational instruction for the information equipment 300 to the information equipment 300.

In step 20, the information equipment 300 sets a variable indicating the route type of the operational instruction for the information equipment 300 (that is, a variable indicating the direct operation). Namely, the information equipment 300 changes the variable stored in the storage unit 330. The information equipment 300 executes an operation corresponding to the operational instruction.

In step 30, the information equipment 300 transmits an INFO command including the operation-route identifier indicating the changed variable to the HEMS 200 (refer to FIG. 10).

Secondly, the case (inside-consumer's-facility operation/indirect operation) where an operational instruction is transmitted from the operation terminal 500B to the information equipment 300 will be described with reference to FIG. 12.

As illustrated in FIG. 12, in step 110 and step 120, the operation terminal 500B transmits the operational instruction for the information equipment 300 to the HEMS 200 through the router 400.

In step 130, the HEMS 200 determines the route type of the operational instruction for the information equipment 300. More specifically, since the operational instruction does not pass through the server 600, the HEMS 200 determines that the route type is the inside-consumer's-facility operation.

In step 140 and step 150, the HEMS 200 transmits the operational instruction for the information equipment 300 to the information equipment 300 through the router 400. More specifically, the HEMS 200 transmits a SET command (first format) including the operational instruction for the information equipment 300 to the information equipment 300 (refer to FIG. 6 or 7).

In step 160, the information equipment 300 sets a variable indicating the route type of the operational instruction for the information equipment 300 (that is, a variable indicating the inside-consumer's-facility operation). Namely, the information equipment 300 changes the variable stored in the storage unit 330. The information equipment 300 executes an operation corresponding to the operational instruction.

In step 170, the information equipment 300 transmits a SET response command including an operation-route identifier indicating the route type of the operational instruction included in the SET command (first format) to the HEMS 200 (refer to FIG. 8).

Thirdly, the case (outside-consumer's-facility operation) where an operational instruction is transmitted from the operation terminal 500C to the information equipment 300 will be described with reference to FIG. 13.

As illustrated in FIG. 13, in step 210A and step 210B, the HEMS 200 transmits a query of an operational instruction or the like to the server 600 through the router 400. It should be noted that the HEMS 200 periodically executes the query of the operational instruction or the like.

In step 220, the operation terminal 500C transmits the operational instruction for the information equipment 300 to the server 600.

In step 230 and step 240, according to the query received from the HEMS 200, the server 600 transmits the operational instruction for the information equipment 300 to the HEMS 200 through the router 400.

In step 250, the HEMS 200 determines a route type of the operational instruction for the information equipment 300. More specifically, since the operational instruction passes through the server 600, the HEMS 200 determines that the route type is the outside-consumer's-facility operation.

In step 260 and step 270, the HEMS 200 transmits the operational instruction for the information equipment 300 to the information equipment 300 through the router 400. More specifically, the HEMS 200 transmits a SET command (second format) including the operational instruction for the information equipment 300 to the information equipment 300 (refer to FIG. 6 or 7).

In step 280, the information equipment 300 sets a variable indicating the route type of the operational instruction for the information equipment 300 (that is, a variable indicating the outside-consumer's-facility operation). Namely, the information equipment 300 changes the variable stored in the storage unit 330. The information equipment 300 executes an operation corresponding to the operational instruction.

In step 290, the information equipment 300 transmits a SET response command including an operation-route identifier indicating the route type of the operational instruction included in the SET command (second format) to the HEMS 200 (refer to FIG. 8).

Herein, although not shown in the flowcharts illustrated in FIGS. 11 to 13, the information equipment 300 may transmit to the HEMS 200 the GET response command including the operation-route identifier indicating the route type of the operational instruction received before the reception of the GET command according to the reception of the GET command (refer to FIG. 9).

As described above, since the variable indicating the route type of the operational instruction on the information equipment 300 is stored in the information equipment 300, it is possible to control the information equipment 300 using the variable indicating the route type. Accordingly, it is possible to perform remote control of the information equipment 300 while considering problems in safety.

[Other Embodiments]

While the invention has been described with reference to the above embodiments, it should not be understood that the description and the drawings as a portion of the disclosure limit the invention. It will be apparent to the ordinarily skilled in the art that various alternative embodiments, examples, and operational techniques are available from the disclosure.

In the embodiments, a case where the communication between the HEMS 200 and the information equipment 300 was performed in the ECHONET Lite protocol was mainly described. However, the embodiments are not limited thereto. The communication between the HEMS 200 and the information equipment 300 may be in accordance with other protocols.

In the embodiments, three types of inside-consumer's-facility operation (direct operation), inside-consumer's-facility operation (indirect operation), and outside-consumer's-facility operation were exemplified as operational instruction route types. However, the embodiments are not limited thereto. Two types of inside-consumer's-facility operation and outside-consumer's-facility operation may be used as the operational instruction route types. Otherwise, the route type of the operational instruction may be the direct operation and operation other than the direct operation.

In the embodiments, the information equipment 300 specifies the inside-consumer's-facility operation and the outside-consumer's-facility operation according to a difference between the formats of the messages including the operational instructions. However, the embodiments are not limited thereto. The information equipment 300 may specify the inside-consumer's-facility operation and the outside-consumer's-facility operation by identifying IP addresses of transmission sources.

In the embodiments, as a name of the information indicating the route type of the operational instruction for the information equipment 300, the "operation-route specifying information" and the "operation-route identifier" are used, but the embodiments are not limited thereto. For example, the SET command, the SET response command, the GET response command, and the INFO command may include information indicating the route type of the operational instruction for the information equipment 300, and the formats of the information (information indicating the route type) included in the messages may be different from each other.

In the embodiments, a case where the control apparatus is the HEMS 200 was exemplified. However, the embodiments are not limited thereto. The control apparatus may be installed in the CEMS 20 or may be installed in the smart server 40. Otherwise, the control apparatus may be installed in a BEMS (building energy management system), may be installed in an FEMS (factory energy management system), or may be installed in an SEMS (store energy management system).

In the embodiment, the consumer's facility 10 is configured to include a load 120, a PV unit 130, a storage battery unit 140, a fuel cell unit 150, and a hot-water storage unit 160. However, the consumer's facility 10 may include any of the load 120, the PV unit 130, the storage battery unit 140, the fuel cell unit 150, and the hot-water storage unit 160.

Note that Japanese Patent Application No. 2013-81676 (filed on Apr. 9, 2013) is incorporated herein by reference in its entirety.

INDUSTRIAL APPLICABILITY

As described heretofore, according to the present invention, it is possible to provide information equipment, a control system and a control method capable of performing remote control of information equipment while considering problems in safety.

The invention claimed is:

1. An information equipment that is controlled by a control apparatus and located in a consumer's facility, comprising:
   a receiver configured to receive a command including an operational instruction on the information equipment, the command including operation route specifying information indicating a route type of the operational instruction, the route type indicating whether or not the operational instruction has been made through a wide area network,
   a storage unit configured to store a variable indicating the route type of the operational instruction based on the operation route specifying information included in the command,
   a control unit configured to control the information equipment based on the operational instruction having the variable indicating the route type of the operational instruction stored in the storage unit.

2. The information equipment according to claim 1, further comprising,
   a notifying unit configured to notify, when the variable stored in the storage unit is changed, the control apparatus of an operation route identifier indicating the changed variable.

3. The information equipment according to claim 1, further comprising,
   a notifying unit configured to notify, according to reception of a setting command comprising said command, the control apparatus of an operation route identifier indicating the route type based on the operation route specifying information.

4. The information equipment according to claim 1, further comprising,
   a notifying unit configured to notify, according to reception of a request command for requesting transmission of information indicating a state of the information equipment, notifies the control apparatus of an operation route identifier indicating the route type based on the operation route specifying information included in the command.

5. The information equipment according to claim 1,
   wherein the variable indicating the route type includes a variable indicating an inside-consumer's facility operation in which an operation is input to the information equipment from an operation apparatus connected to a narrow area network installed in the consumer's facility and a variable indicating an outside-consumer's facility operation in which an operation is input to the information equipment from an operation apparatus connected to the wide area network different from the narrow area network.

6. The information equipment according to claim 5,
   wherein the variable indicating the inside-consumer's facility operation includes a variable indicating a direction operation in which an operation is directly input to the information equipment without intervention of another equipment and a variable indicating an indirection operation in which an operation is indirectly input to the information equipment via another equipment.

7. A control system, comprising:
   an information equipment that is located in a consumer's facility; and
   a control apparatus configured to control the information equipment, wherein
   the control apparatus comprises a transmitter configured to transmit a command including an operational instruction on the information equipment, the command including operation route specifying information indicating a route type of the operational instruction, the route type indicating whether or not the operational instruction has been made through a wide area network, and
   the information equipment includes a storage unit configured to store a variable indicating the route type of the operational instruction based on the operation route specifying information included in the command, and
   a control unit configured to control the information equipment based on the operational instruction having the variable indicating the route type of the operational instruction stored in the storage unit.

8. A control method used in a control system including information equipment that is located in a consumer's facility and a control apparatus that controls the information equipment, the control method comprising:
   a step of transmitting, from the control apparatus to the information equipment, a command including an operational instruction on the information equipment, the command including operation route specifying information indicating an route type of the operational instruction, the route type indicating whether or not the operational instruction has been made through a wide area network,
   step of storing, by the information equipment, a variable indicating the route type of the operational instruction based on the operation route specifying information included in the command, and
   a step of controlling the information equipment based on the operational instruction having the stored variable indicating the route type of the operational instruction.

* * * * *